April 26, 1966 A. S. CHAPMAN 3,247,731
FLEXIBLE SEAL
Filed Sept. 30, 1963 3 Sheets-Sheet 1

INVENTOR
ARTHUR S. CHAPMAN,
BY
Walter R. Thiel
ATTORNEY.

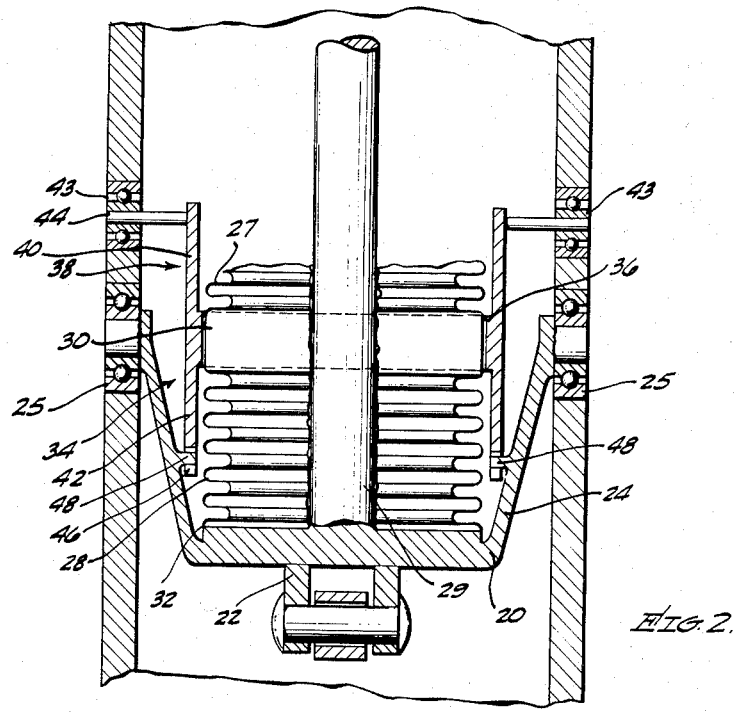
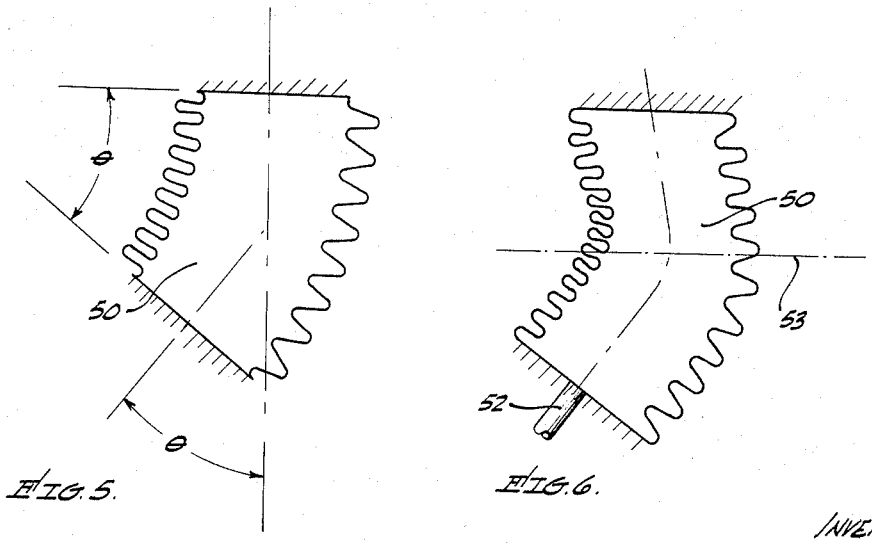

April 26, 1966 A. S. CHAPMAN 3,247,731
FLEXIBLE SEAL
Filed Sept. 30, 1963 3 Sheets-Sheet 3

INVENTOR.
ARTHUR S. CHAPMAN,
BY Walter R. Thiel
ATTORNEY.

United States Patent Office 3,247,731
Patented Apr. 26, 1966

3,247,731
FLEXIBLE SEAL
Arthur S. Chapman, Rolling Hills, Calif., assignor to Hughes Aircraft Company, Culver City, Calif., a corporation of Delaware
Filed Sept. 30, 1963, Ser. No. 312,711
2 Claims. (Cl. 74—18.1)

This invention relates generally to flexible hermetic seals and in particular to an improved bellows type seal.

The logistical and operational requirements of current airborne systems require the development of equipment which will operate unattended for long periods of time. An example of this is the low temperature cooling system for certain of the components of an infrared detection system which must be small, lightweight, and have a relatively long useful life.

Systems of this type employ gases as the cooling medium. These gases are compressed and are then subjected to controlled expansion usually in some type of Joule-Thompson device such as a cryostat wherein gas expansion cooling and eventual liquification takes place. The nature of a Joule-Thompson device requires that the gas be maintained relatively free of contaminants, otherwise clogging takes place; therefore, such systems utilize unlubricated compressors. However, this presents many problems among which is the requirement that an absolute seal be provided to isolate the drive mechanisms from the compressor to prevent the lubricants associated with the drive mechanisms from contaminating the gas stream developed by the compressor.

One object of this invention is to provide an improved flexible hermetic seal.

Another object of this invention is to provide an improved bellows type seal having an increased pressure capability.

A further object of this invention is to provide an improved bellows type hermetic seal for a compressor having a relatively long life.

The above enumerated objects are accomplished according to one embodiment of this invention in a seal of the bellows type which includes a metallic thin wall bellows and a cage or vertebra member circumscribing the bellows to increase the bending stiffness thereof. In a preferred configuration the bellows is configured into two cylindrical portions each having a plurality of convolutions with a rigid cylinder between and an attachment flange at each of the free ends. The cage member includes a cylindrical portion circumscribing the rigid cylinder and a pair of positioning fingers projecting from the cylindrical portion and extending longitudinally on opposite sides of the cylindrical portions of the bellows. Each of the fingers includes at its extremity a positioning means, such as a groove or a pin to position the cage within a using device such as a compressor.

Other objects and advantages will become apparent from a study of the following description when considered in conjunction with the accompanying drawings, in which:

FIG. 2 is a sectional view taken at 2—2 in FIG. 1 illustrating the positioning of the cage member and the bellows;

FIG. 5 is a schematic representation of a bellows fixed at both ends illustrating the deflection of one end about the centerline of the bellows;

FIG. 6 is a schematic representation of the bellows shown in FIG. 5 illustrating the toggling effect of the bellows after it is pressurized to a critical value and then deflected through an angle $\theta$;

Figure 1:
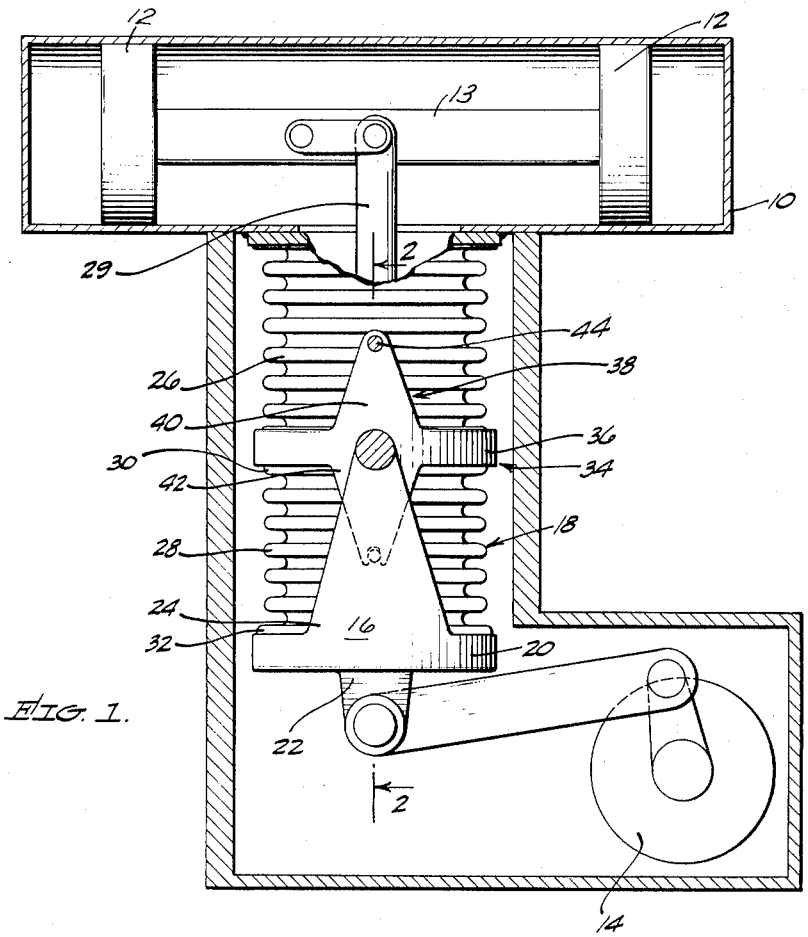
FIGURE 1 is a side elevational view of a schematic representation of a compressor shown partly in section and having a portion cut away to illustrate the bellows seal and cage member of the present invention.

The compressor illustrated in FIGS. 1 and 2 comprises a housing 10 enclosing a pair of piston members 12 connected to a shaft 13 which in turn are operatively connected to a motor-crank arrangement 14 by a rocker arm 16. The rocker arm 16 extends through a seal 18 that hermetically seals the chamber surrounding the piston 12 from the chamber surrounding the motor-crank arrangement 14 and comprises a base plate 20 having a flange 22 operatively attached to the motor-crank arrangement 14 and a pivot flange 24 pivotally attached to the housing 10, such as by a pair of conventional roller bearings 25. The rocker arm 16 also includes a connecting shaft 29 extending from the base plate 20 through the seal 18 which is suitably attached to the piston member 12. Thus in this simple configuration an operation of the crank-motor arrangement 14 causes the rocker arm 16 to pivot about the bearings 25 imparting to the piston member 12 a reciprocal rectilinear motion.

In the preferred embodiment the seal 18 is of the bellows type, constructed of a material such as nickel and has a first and a second portions or parts 26, 28 each of substantially equal height and diameter and including the same number of convolutions. The bellows parts 26, 28 are separated by a rigid cylinder 30 having a diameter substantially the same as the outside diameter of the convolutions and terminate in an attachment flange 32 at the other extremity which may have a diameter larger than that of the rigid cylinder 30. In the presently illustrated application of the seal the attachment flange 32 is attached to the housing 10 and the base plate 20 by conventional attachment means such as welding. While the bellows parts 26, 28 have been described as being substantially identical, it should be understood that this is a preferred embodiment, and that these parts need not be identical but may have different dimensions and number of convolutions within the teaching of this invention.

Circumscribing the bellows is a cage or vertebra member 34, of a material such as aluminum which includes a cylindrical portion 36 and a plurality of positioning members 38 which extend longitudinally of the bellows on opposite sides thereof. The cylindrical portion 36 has an inside diameter slightly larger than the diameter of the rigid cylinder 30 so that it may be easily positioned over the cylinder 30. The positioning members 38 include a pair of first and second fingers 40, 42 which have at their extremities a laterally extending pin 44 and a longitudinally extending slot 46, respectively. Therefore, by positioning the cage 34 around the bellows and by pivotally mounting the pins 44 in the housing such as by a pair of conventional roller bearings 43 and by inserting a pin 48 extending from a portion of the rocker arm in the slot 46 any movement of the rocker arm causes the cage to pivot about the pivot point defined by the pins 44.

The internal pressure capability of the bellows seal is enhanched by the addition of the cage member 34 in two ways. Firstly, the diameter to length ratio of the bellows is increased by a factor of two since the addition of the cage creates, rather than a single bellows, two bellows each of substantially the same length. As shown below this increases the critical buckling pressure by a factor of 4. Secondly, the angular displacement of the first part 26 of the bellows relative to the second part 28 is reduced thereby reducing the toggling effect on the bellows.

Figure 3:
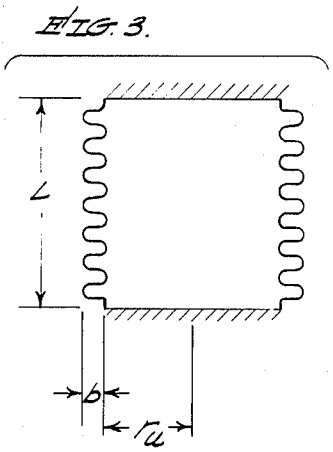
FIGS. 3 and 4 are schematic representations of a bellows illustrating the definition of certain terms utilized in the formula for computing the critical internal pressure of a bellows.
Figure 4:
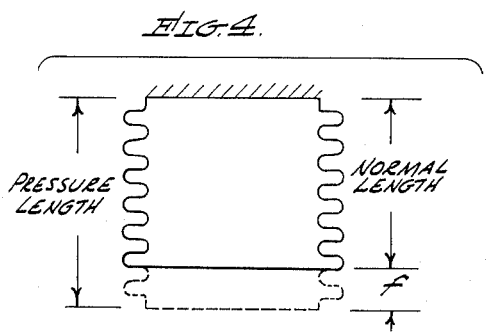

As stated in the report "Instability of Bellows Subjected to Internal Pressure," Phillips Research Report, Volume 7, 1952, pp. 189–196, when a bellows is analogized to a Euler column the critical buckling pressure can be computed from the equation:

$$q' = \frac{K'E'h^3 r_u}{b^3 n L (1 - f/f_0)}$$

Where the quantities are defined as follows and depicted in FIGS. 3 and 4.

$q'$ = critical buckling pressure of the bellows
$K'$ = a term which defines the stiffness of the convolutions and is a function of $r_l$, $r_u$, and the width of the convolutions
$E'$ = Youngs modulus
$h$ = thickness of the walls of the convolutions
$r_u$ = outside radius of the convolutions
$b$ = depth of the convolutions
$n$ = number of convolutions associated with the length of the bellows
$L$ = length of the bellows
$f_0$ = axial extension of an equivalent free bellows when pressurized
$f$ = axial extension of bellows allowed by mechanism It is seen from the above equation and definitions that if a cage is added as an additional constraint on the bellows than $n$, $L$, $f_0$, and $f$ are the only terms that are effected. For most applications and materials $f_0$ and $f$ can be assumed to be negligible; therefore, since $n$ changes as a function of the change in L the change in critical buckling pressure produced by the addition of a cage is approximately proportional to $$\Delta q' \cong \frac{1}{\Delta L^2}$$

Thus by adding the cage at the center of the bellows the critical buckling pressure is increased by a factor of 4 and since the bending stiffness of the bellows is directly related to the critical buckling pressure it too is increased by a factor of 4.

Figure 7:
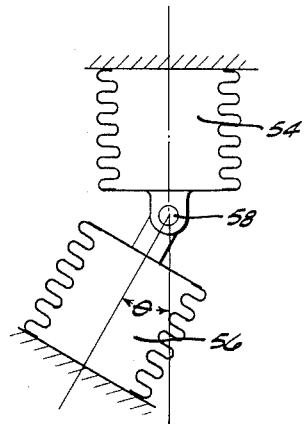
FIGS. 7 and 8 illustrate a modified configuration of a bellows to more clearly visualize the toggling effect produced by a critical pressurization of the bellows and a deflection through an angle $\theta$.
Figure 8:
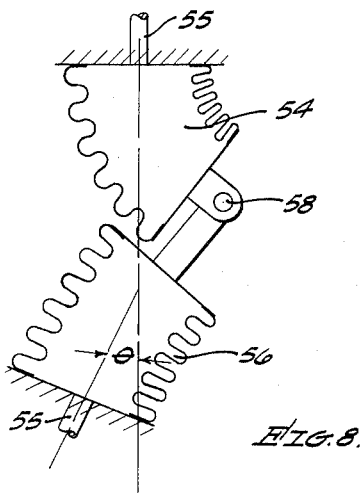
Figure 9:
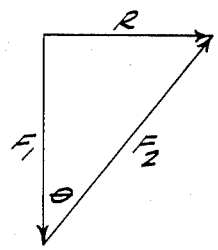
FIG. 9 is a vector diagram depicting the magnitude and the directions of the forces acting on the pivot point shown in FIG. 8.
Figure 10:
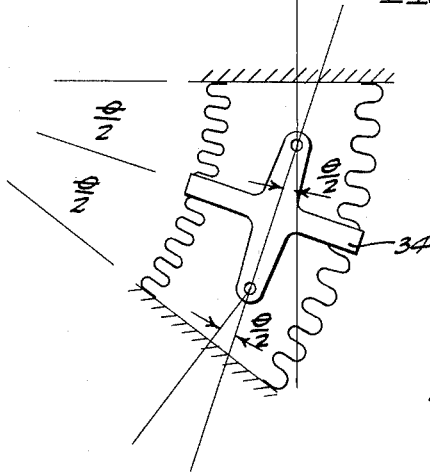
FIG. 10 is a schematic representation of the bellows and cage member of the present invention illustrating the function of the cage member to increase the bending stiffness of the bellows.

The toggling force exerted on the bellows is the second effect that is reduced by the addition of the cage member 34. To understand this effect, first consider a bellows 50 fixed at one end with the other end deflected through an angle $\theta$ as shown in FIG. 5. Now considering the bellows 50 when it is pressurized by an external pressure source (not shown) through a port 52 as shown in FIG. 6, if the bellows 50 is pressurized above the critical pressure for the bellows it will toggle about a generally center point 53. To better understand this effect, cut the bellows 50 shown in FIG. 5 into a first and a second section 54, 56 and place a pivot joint 58 between the two sections, FIG. 7. When the first and second sections 54, 56 are pressurized, by the introduction of pressure, through a plurality of ports 55, FIG. 8, each exerts a force $F_1$, $F_2$, respectively, on the pivot point 58 equal to the pressure times the cross-sectional area of the bellows as shown diagrammatically in FIG. 9. However, since the second section 56 has been rotated about the pivot joint 58 through an angle $\theta$, the forces $F_1$, $F_2$, are not balanced and the resultant force R will displace the joint in a sideways or lateral fashion as shown in FIG. 8. Thus the magnitude of the resultant force R when considering the bellows 50 shown in FIG. 6 is a function of the angle through which it is deflected (ang't $\theta$), the pressure, the bending stiffness of the bellows and the cross-sectional area of the bellows. As shown in FIG. 10 by utilizing the cage 34 the angle $\theta$ is reduced by one half since each part of the bellows will deflect through an angle equal to one half of the total angle of deflection; this in turn reduces the resultant force R and corresponding the toggling force.

The location of the center of pivot bearings 25 of the rocker arm 16 above the base plate 20 is important and for optimum results should be equal to one half the length L of the bellows. Correspondingly, in the present embodiment, since the critical length of the bellows is effectively reduced to one half the optimum location of the center of the pivot bearings 43 of the cage 34 should be at a point that is one quarter of the total length L of the bellows.

While a bellows and cage arrangement has been shown for a single motion in a single plane it should be understood that a rotary motion may equally as well be transmitted by substituting suitable gimbaling rings for the pivot bearings. In addition, when a pressurized line or bellows must be cycled over large angular excursons and one cage is insufficient to gain the desired pressure capabilities then a multiple cage system may be utilized within the teachings of the present invention.

While one embodiment of this invention has been herein illustrated it will be appreciated by those skilled in the art that variations of the disclosed arrangement both as to its details and as to the organization of such details may be made without departing from the spirit and scope thereof. Accordingly, it is intended that the foregoing disclosure and the showings made in the drawings shall be considered as illustrative of the principles of this invention and not construed in a limiting sense.

What is claimed is:

1. In combination:
   a compressor member including a reciprocating piston arrangement enclosed within a housing, said compressor being adapted to develop a high pressure contaminant free gas;
   a drive means including a prime mover coupled to a crank mechanism;
   a rocker arm including an elongated portion having the piston arrangement coupled to one end and the drive means coupled to the other, said arm being adapted to be pivoted at a point intermediate the ends to transmit the rotational motion of said crank into the rectilinear motion of said piston;
   a sealing means attached to said housing and to said rocker arm and adapted to circumscribe said rocker arm elongated portion, said means having two flexible parts separated by a rigid cylinder; and
   a cage member having a cylindrical portion affixed to said rigid cylinder and first and second finger portions each extending longitudinally of a different one of said flexible parts, said first finger portion being pivotally attached to said compressor housing and said second finger portion being movably secured to said rocker arm so that the pivoting of the rocker arm causes the cage to pivot.

2. In combination:
   a compressor member including a reciprocating piston arrangement enclosed within a housing, said compressor being adapted to develop a high pressure contaminant free gas;
   a drive means including a prime mover coupled to a crank mechanism;
   a rocker arm including an elongated portion having the piston arrangement coupled to one end and the drive means coupled to the other, said arm being adapted to be pivoted at a point intermediate the ends to transmit the rotational motion of said crank into the rectilinear motion of said piston;
   a metallic thin wall bellows attached to said housing and to said rocker arm and adapted to circumscribe said rocker arm elongated portion, said bellows having two parts each including a plurality of convolutions separated by a rigid cylinder; and a cage member having a cylindrical portion affixed to said rigid cylinder and first and second finger portions each extending longitudinally of a different one of said bellows parts, said first finger portion being pivotally attached to said compressor housing and said second finger portion being movably secured to said rocker arm so that the pivoting of the rocker arm causes the cage to pivot to increase the pressure capability of the bellows.

References Cited by the Examiner

UNITED STATES PATENTS

| 1,731,009 | 10/1929 | King | 74—18 |
| 2,852,041 | 9/1958 | Stinson | 74—18 |
| 3,068,707 | 12/1962 | Newcomb et al. | 74—18.2 |

MILTON KAUFMAN, WESLEY S. RATLIFF, JR., *Examiners.*

BROUGHTON G. DURHAM, *Primary Examiner.*